Figure 20:
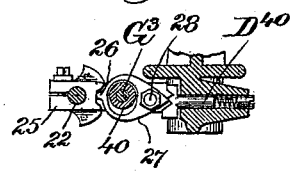

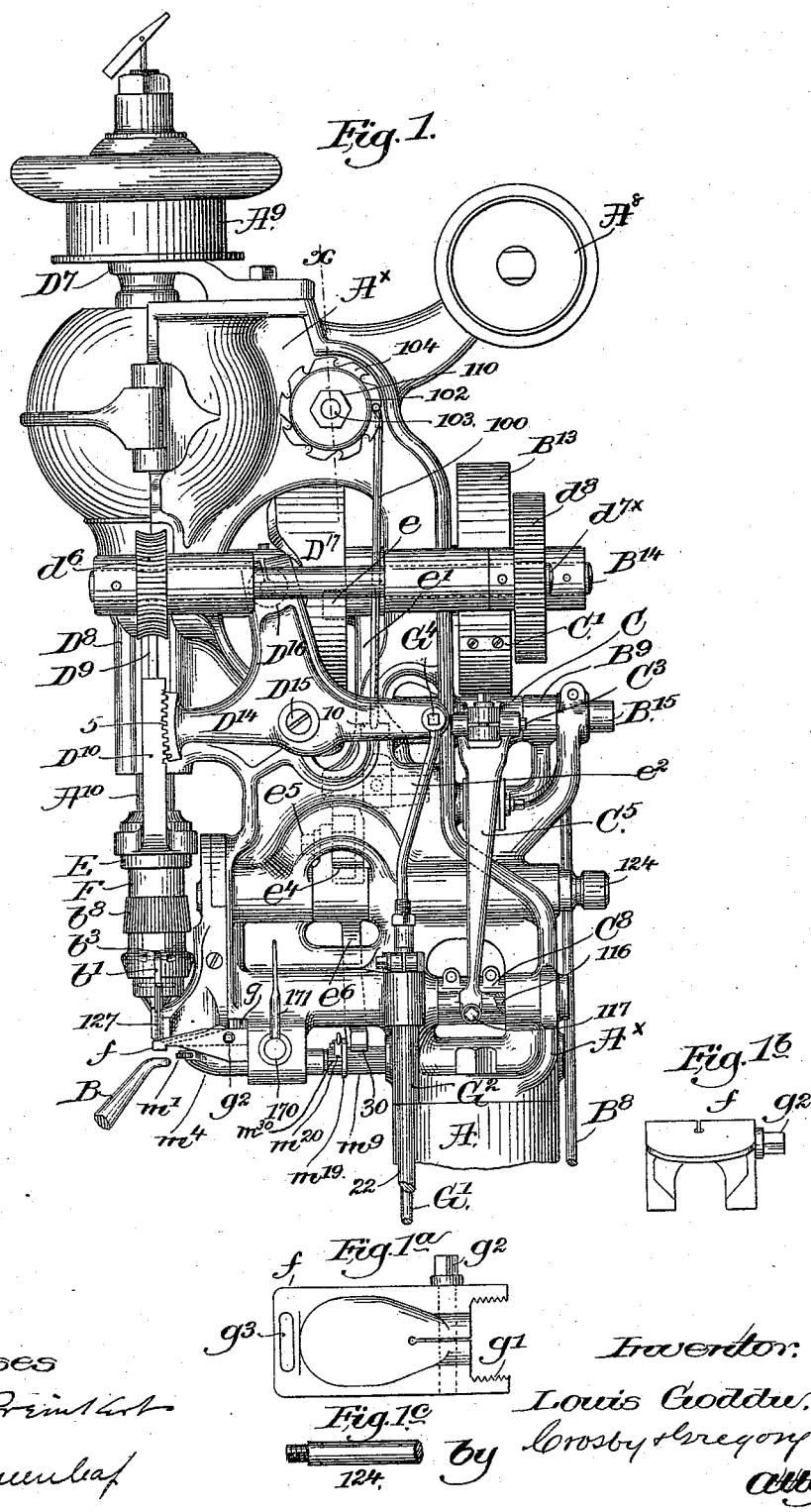

(No Model.) 7 Sheets—Sheet 2.
L. GODDU.
MACHINE FOR UNITING SOLES TO UPPERS.
No. 490,621. Patented Jan. 24, 1893.
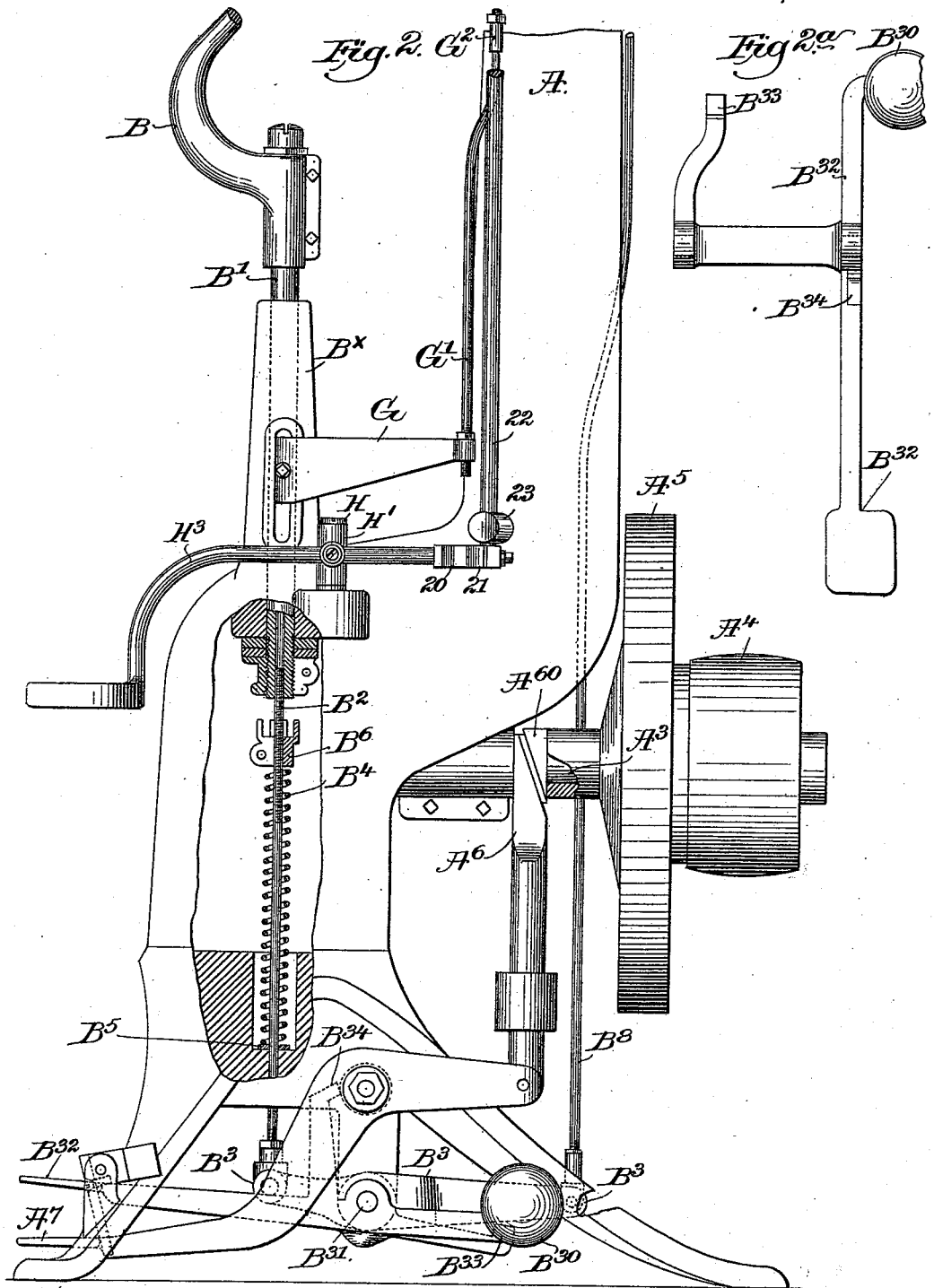
Witnesses:
Fred L. Greenleaf.
John F. C. Preinhlet.
Inventor:
Louis Goddu
by Crosby & Gregory Attys.

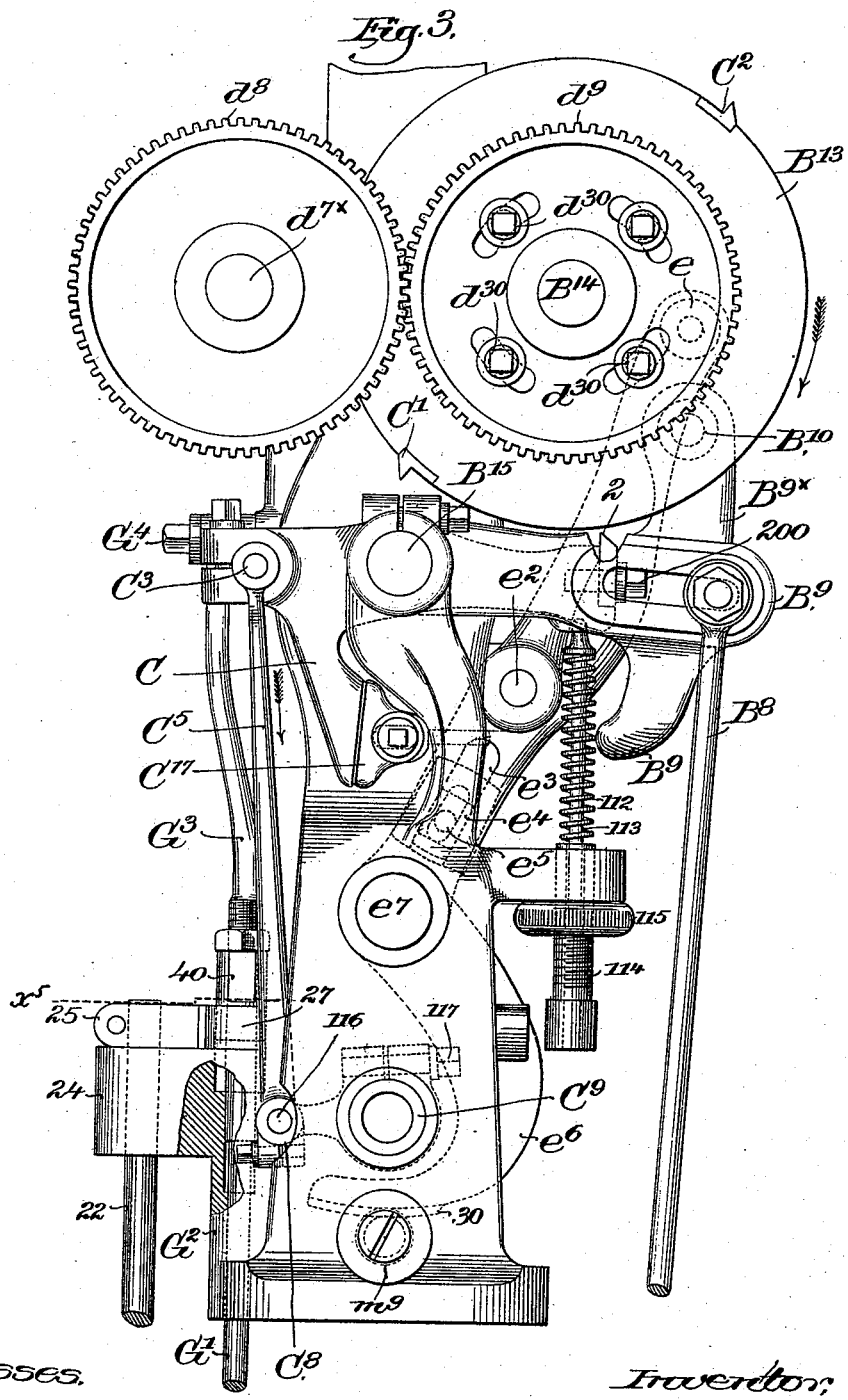

(No Model.) 7 Sheets—Sheet 4.
L. GODDU.
MACHINE FOR UNITING SOLES TO UPPERS.
No. 490,621. Patented Jan. 24, 1893.
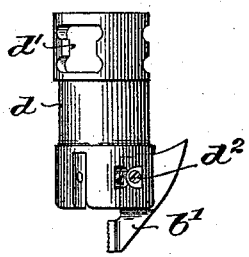
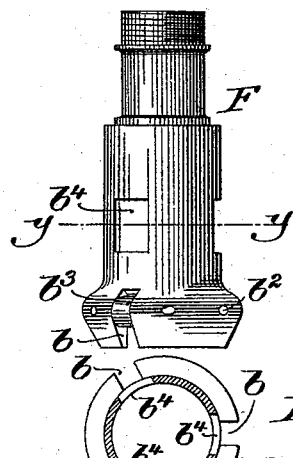
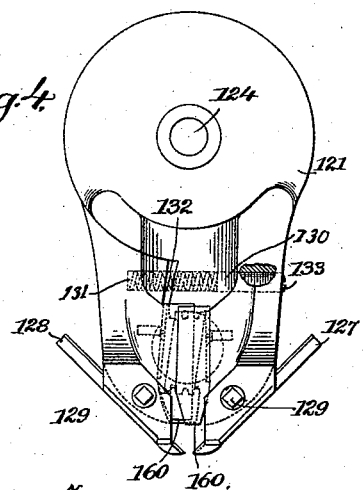
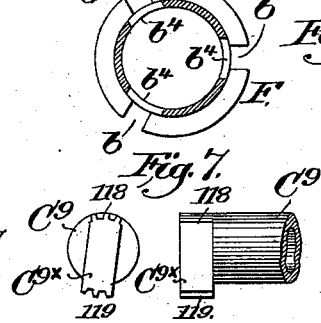
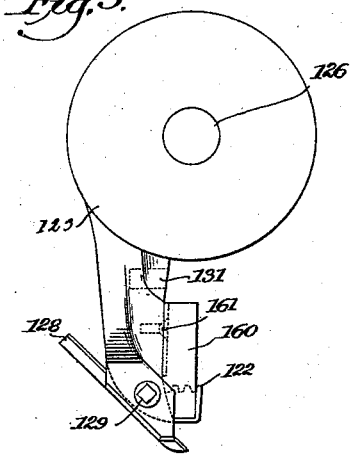
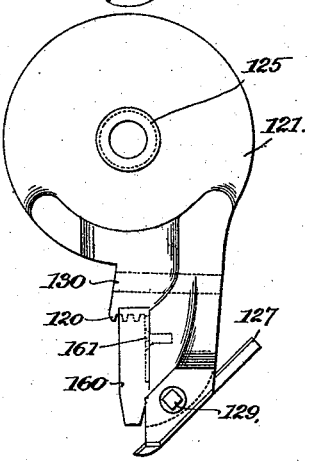
Witnesses.
Inventor:
Louis Goddu
by Crosby & Gregory
Attys.

(No Model.) 7 Sheets—Sheet 5.
L. GODDU.
MACHINE FOR UNITING SOLES TO UPPERS.
No. 490,621. Patented Jan. 24, 1893.
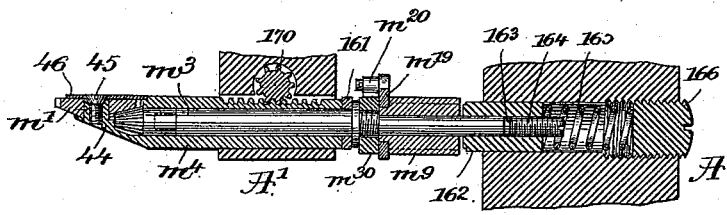
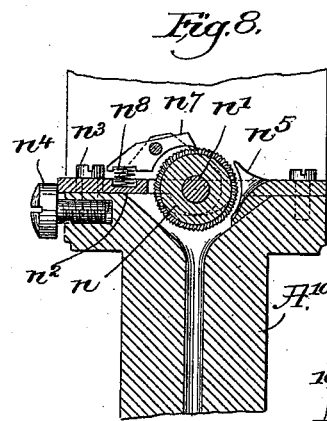
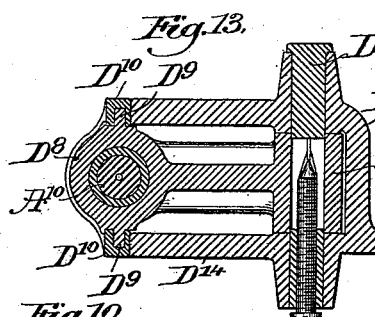
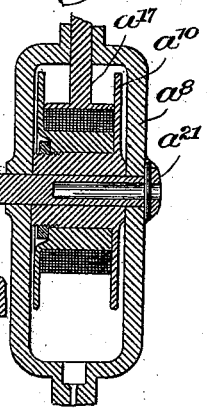
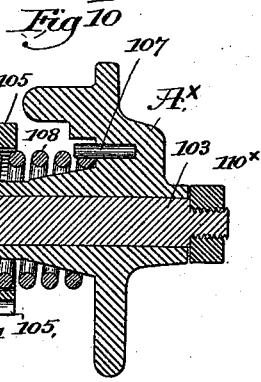
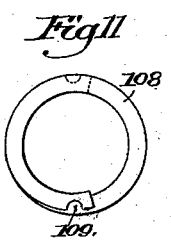
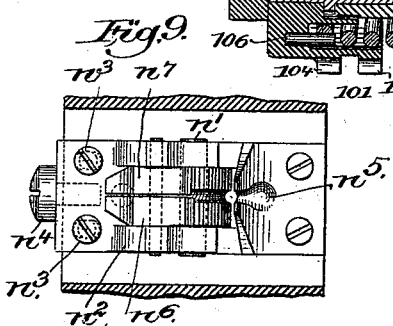

(No Model.) 7 Sheets—Sheet 6.
L. GODDU.
MACHINE FOR UNITING SOLES TO UPPERS.
No. 490,621. Patented Jan. 24, 1893.
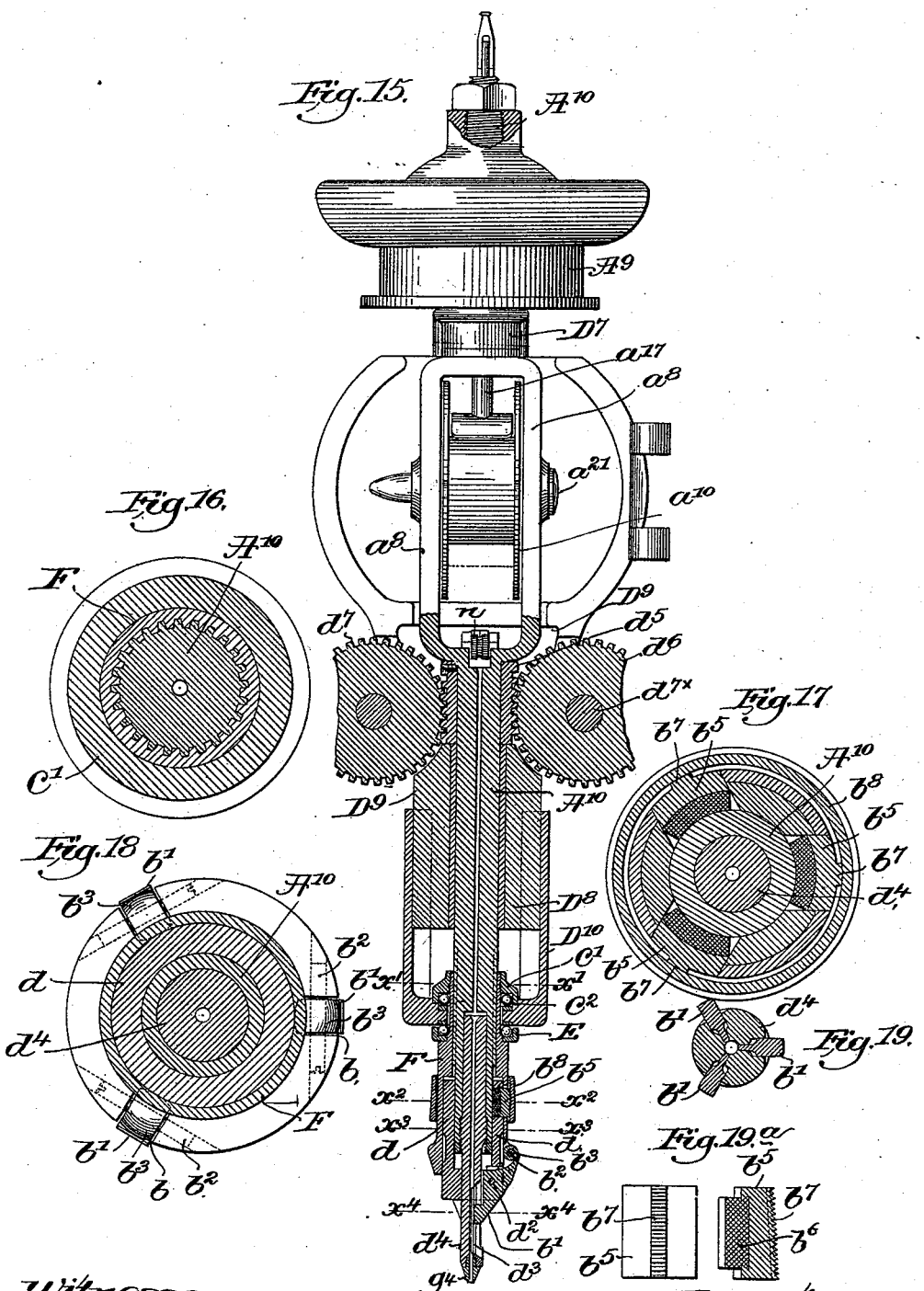

(No Model.) 7 Sheets—Sheet 7.

L. GODDU.
MACHINE FOR UNITING SOLES TO UPPERS.

No. 490,621. Patented Jan. 24, 1893.

Witnesses.
Fred S. Greenleaf
John F. L. Prinkert

Inventor
Louis Goddu
by Crosby & Gregory
Attys.

THE NORRIS PETERS CO., PHOTO-LITHO., WASHINGTON, D. C.

UNITED STATES PATENT OFFICE.

LOUIS GODDU, OF WINCHESTER, ASSIGNOR TO JAMES W. BROOKS, PRINCIPAL TRUSTEE, OF PETERSHAM, AND FRANK F. STANLEY, ASSOCIATE TRUSTEE, OF SWAMPSCOTT, MASSACHUSETTS.

MACHINE FOR UNITING SOLES TO UPPERS.

SPECIFICATION forming part of Letters Patent No. 490,621, dated January 24, 1893.

Application filed April 7, 1892. Serial No. 428,151. (No model.)

*To all whom it may concern:*

Be it known that I, LOUIS GODDU, of Winchester, county of Middlesex, State of Massachusetts, have invented an Improvement in Machines for Uniting Soles to Uppers, of which the following description, in connection with the accompanying drawings, is a specification, like letters and figures on the drawings representing like parts.

This invention has for its object to improve and simplify the construction of that class of machines for uniting soles to uppers in which is employed a rotating spindle containing a screw-threaded wire, which latter as it is rotated has its free end screwed or forced into the material for a greater or less distance according to the thickness of the material resting upon a suitable horn or work support. The wire when inserted into the material for a distance equal to the length of the fastening required at that point in the material, is cut off close to the material, and, the latter having been fed over the work support, the end of the wire is again inserted and again cut off to form a fastening, this operation being continued.

The machine herein to be described is intended as an improvement on that shown in United States Patent, No. 403,835, wherein the wire is fed by feed rolls located at the lower end of the spindle quite close to the cutters, the said feed rolls maintaining a continued hold on the wire.

In the machine herein to be described, as in the patent referred to, the threaded wire to be used is taken from a reel having its axis of rotation substantially in line with the axis of rotation of the spindle, through which the screw-threaded wire is passed on its way into the material, and the spindle, fluted longitudinally at its outer side, is rotated at very high speed.

In this present invention, the fluted part of the spindle engages and rotates with it an outer or feeding sleeve provided with one or more gripper closing devices or surfaces herein shown as anti-friction rolls, the said sleeve having openings at its side to receive friction blocks, which latter are also extended through openings made in a sleeve-like gripper-carrier, the slot in the outer sleeve being longer than in the gripper carrier to enable the grippers to be relaxed from the wire. The sleeve-like gripper carrier has at its lower end and preferably pivoted thereon, one or more grippers which have their preferably serrated acting ends or edges normally retained in suitable slots in a spindle-extension having a central wire passage co-incident with the wire passage in the main part of the spindle. The gripper carrier derives its rotation from the outer sleeve acting on the friction devices or blocks. The inner sides of the friction devices referred to engage the periphery of the spindle, thus connecting the gripper carrier frictionally therewith, but leaving the gripper carrier capable of being moved upwardly longitudinally on the spindle when acted upon by the lower ends of the slots in the outer or feeding sleeve during its ascent, as when the grippers are to be released from the wire, there being enough lost motion or play due to the excess of length in the slots of the feeding sleeve as compared with the length of said blocks, to enable the sleeve to be moved for a slight distance upwardly from the lowest point of its stroke before contacting with the friction blocks, to thus let the gripper closing surfaces retire from the grippers in order that they may release the wire. In practice, however, the upper ends of the slots in the friction sleeve, as long as the wire is present in the spindle between the grippers, will not contact with the friction blocks, for just prior to the arrival of the upper ends of the slots of the sleeve in contact with the friction blocks, the gripper closing surfaces of the outer or feeding sleeve act upon the inclined upper ends of the grippers, shown as levers, and cause them to grasp the wire firmly between their lower ends and thereafter during the further descent of the feeding sleeve,— it acting directly upon the grippers,—the said sleeve, solely by its pressure against the grippers, maintains the engagement of the grippers with the wire, keeping up this engagement until the end of the wire has been properly inserted into the material. In this manner, when desired and preferably so, all the force of the feeding sleeve in its downward movement may be put directly upon the grippers, and through the grippers upon the wire. The end of the wire having been inserted into the stock for a suitable length and caught between the wire cutters, the outer or feeding sleeve is elevated, the starting of the sleeve in its ascent immediately removing the gripper closing surfaces from the grippers so that the latter are permitted to release the wire prior to the rising or upward movement of the grippers outside the wire, the latter being at such time prevented from retrograde or back movement by a suitable detent or brake, herein represented as a roll having an annular groove, the bottom of which is threaded or serrated to correspond substantially with the pitch of the thread of the wire, the threads of the wire entering the serrations, a suitable pawl or equivalent device preventing the rotation of the retaining device except in the direction of the feed of the wire. As the wire feeding grippers are mounted on the gripper carrier and the latter is held frictionally in contact with the rotating spindle, the said carrier does not start to rise with the feeding sleeve until after the latter has been elevated sufficiently or moved away from the grippers far enough to leave them free to turn on their pivots and retire from the wire, but this done, the ends of the slots in the sleeve act on the friction blocks or devices and move the gripper carrier with the sleeve during the remaining part of the upward stroke of the sleeve.

The friction blocks referred to are kept in place as against radial movement, and the force with which the inner faces of the said blocks are made to engage the spindle is determined or regulated by a regulating device shown as a ring having screw-threads to engage threads at the outer sides of the blocks, the inner sides of the blocks being faced preferably with or receiving a suitable friction surface preferably leather or some equivalent material.

The regulating ring will preferably be made tapering at its inner side and be sufficiently thin to yield somewhat so as to compensate for wear on the leather of the several friction blocks, and insure uniformity of friction.

A friction device to co-operate with the spindle, the gripper carrier, and sleeve, as stated, during a part of each movement of the feeding sleeve, is an essential feature of this invention, and it is not intended therefore to limit the invention to the particular form of friction device shown. The outer or feeding sleeve is embraced by a reciprocating yoke common to the patent referred to.

The wire to be used in this machine will preferably be of the class containing a double thread, such as described in a patent heretofore granted to me, No. 370,136, September 20, 1887. The spindle as herein shown is made in two parts, the lower part, called herein the spindle-extension being of smaller diameter and inserted in an opening in the main part of the spindle. The extension is slotted to enable the wire feeding grippers to engage the wire through the slots. Preferably the extension will be fluted externally to engage flutes inside the main body of the spindle, but the connection may be made in any suitable manner, the provision of making the said slotted extension detachable resulting in great saving in running the machine as it reduces the cost of repairs in case of wear of the extension by the grippers and the wire.

In connection with the brake referred to it is preferred to use two pawls so constructed or mounted that when one is operated the other will remain substantially midway the teeth of the ratchet, to thus insure finer measurement in the fastenings to be cut from the wire. The wire passage outside the brake is acted upon by a guide, the chief function of which is to keep the wire properly in the groove of the brake, the said guide, shown as a movable block, having its acting face so shaped that it will properly co-operate with the wire coming off the reel and into the spindle, notwithstanding variations in diameter of the coil of the wire. This brake will preferably be made adjustable with relation to this guide, but the converse would be within the scope of my invention.

Figure 22:
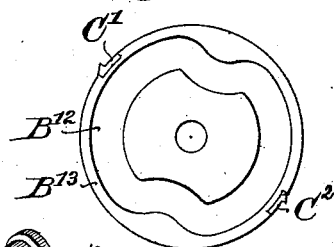
Figure 23:
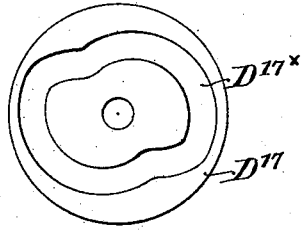
Figure 21:
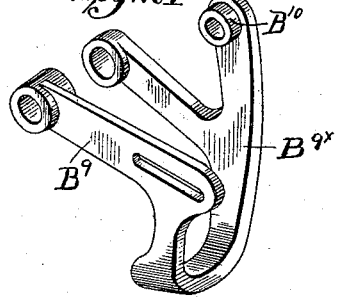
Figure 24:

Fig. 1, is a partial right-hand side elevation of a screw-threaded wire inserting machine embodying this invention, said Fig. showing part of the horn. Fig. 1$^a$ represents an underside view of the foot enlarged. Fig. 1$^b$, an outer end view of the foot shown in Fig. 1$^a$. Fig. 1$^c$ a detail to be referred to. Fig. 2 shows the remaining portion of the right-hand side of the machine shown in Fig. 1, some of the parts being partially broken out to show other parts, the tip of the horn omitted from Fig. 2 being shown in Fig. 1. Fig. 2$^a$ is a detail showing the lever B$^{32}$. Fig. 3, is a rear side elevation of the most of the upper part or head of the machine, shown in Fig. 1, but enlarged. Fig. 3$^a$ shows the gripper carrier with one of the grippers. Fig. 3$^b$ shows the outer or feeding sleeve with one of the closing devices. Fig. 3$^c$ is a section of the feeding grippers, and sleeve in the line $y-y$, Fig. 3$^b$. Fig. 4, is a detail showing the cutting levers, cutters, and segments for actuating them, Figs. 5 and 6 show the cutter carrying levers or arms separately. Fig. 7, represents in two views the sector block for actuating the cutters, Fig. 8, is an enlarged detail showing the upper end of the spindle broken out to represent the brake within it, Fig. 9 is a plan or top view of Fig. 8, Fig. 10, an enlarged section in the line $x$ Fig. 1, chiefly to show the device employed for normally holding down the rear end of the lever D$^{14}$ and keeping the measuring-leg in contact with the measuring stop. Fig. 11 shows the spring of Fig. 10 detached, Fig. 12 is a longitudinal sectional detail of the devices employed for feeding the shoe, Fig. 13, a detail showing the fulcrum pin for the lever D$^{14}$. Fig. 14, a detail chiefly to show the stud about which the spool carrying the wire rotates. Fig. 15, an enlarged detail partially in section taken longitudinally through the spindle and the wire feeding device surrounding it, together with the worm on the spindle, and the two worm gears actuated by it, the door inclosing the chamber in which the spool $a^{10}$ rotates being omitted. Fig. 16 is a partial section much enlarged, in the line $x'$, Fig. 15, showing the upper member of the clutch box as surrounding the upper end of the outer or feeding sleeve. Fig. 17 is a much enlarged section in the line $x^2$, Fig. 15. Fig. 18, a much enlarged section in the line $x^3$, Fig. 19, a much enlarged section in the line $x^4$, Fig. $19^a$ represents one of the friction blocks in side view and section. Fig. 20, a sectional detail below the line $x^5$, Fig. 3. Fig. 21 shows the lever $B^9$ in perspective, Fig. 22, an inner side view of the cam $B^{13}$. Fig. 23, a rear side view of the cam $D^{17}$. Fig. 24, a view developed of the front side of the cam $D^{17}$, or the side having projections to actuate the lever $D^{14}$ for effecting the feeding of the threaded wire.

Referring to the drawings, A represents a suitable column upon which is mounted a head $A^\times$, the latter being of suitable shape and having suitable bearings for the different working parts to be described. The column has, as represented, a sort of sleeve $B^\times$, which receives the shank $B'$ of a suitable horn or work support B. The shank $B'$ at its lower end has connected with it a suitable rod $B^2$ having an adjustable nut $B^6$, against the underside of which bears a spring $B^4$, the said spring being seated on a suitable washer $B^5$, so that the spring normally acts to elevate the horn and keep it in contact with the fixed foot $f$ which rests against the upper side of the work or material into which will be inserted the threaded end of the wire to be cut off to form a fastening. The rod $B^2$ is connected to one end of a lever $B^3$, shown by full and dotted lines Fig. 2, the opposite end of said lever having connected to it the rod $B^8$, in turn jointed in an adjustable manner to a lever $B^9$, see Figs. 1, 3 and 21, having its fulcrum at $B^{15}$, the shape of the said lever being best shown in Figs. 3 and 21, the said lever having a U-shaped extension $B^{9\times}$ provided with a roller or other stud $B^{10}$ which enters a groove $B^{12}$ in a cam $B^{13}$ shown separately in Fig. 22, and fast upon the cam shaft $B^{14}$. The rotation of the cam $B^{13}$ through the devices described raises and lowers the horn automatically twice during each rotation of the shaft, the horn being depressed just before the feed is to take place, for herein it is desired to insert two fastenings at each rotation of the cam-shaft. The fulcrum $B^{31}$ for the lever $B^3$ also sustains a horn lowering lever $B^{32}$ the shape of which is best shown in Fig. $2^a$, said lever having a forward extension adapted to receive upon it the foot of the operator, an arm $B^{33}$ which is adapted to contact with the underside of the lever $B^3$, and a third arm having on it a weight $b^{30}$ which normally acts to keep the front of the lever $B^{32}$ elevated, a projection $B^{34}$ of the lever by acting against a suitable stop determining the normal position of the lever $B^{32}$. The shank $B'$ has extended from it an arm G, to the outer end of which is joined a measuring rod $G'$, the upper end of which enters a suitable guide $G^2$ connected to or forming part of the frame-work. The upper end of the rod $G'$ serves as a variable stop, against which may rest the lower end of the measuring leg $G^3$ jointed by a pin $G^4$ to one arm of a three-armed lever $D^{14}$ having its fulcrum at $D^{15}$.

A collar 102 and spring 108 acting through a rod 100 resting on a lug 10, shown by dotted lines Fig. 1 at the inner side of the lever $D^{14}$ normally keeps the roll $D^{16}$ carried by one arm of the lever $D^{14}$ pressed toward the cam projections at the face of the cam $D^{17}$, said cam having two projections to vibrate the said lever twice during each rotation of the cam shaft $B^{14}$ upon which it is mounted. The collar 102 is placed on the stud 103 and is clamped thereon between a flange on the stud and a nut 110. The stud 103 is fitted loosely into a bearing in the frame $A^\times$ and a nut $110^\times$ prevents the escape of the stud from the said bearing. The collar 102 has a pin or projection 106 which is engaged by a notch 109 of the spring 108, best shown in Fig. 11, the opposite end of said spring being engaged by the fixed pin 107.

The cam $D^{17}$ is shown best in Figs. 1 and 24.

The position to which the measuring rod $G'$ is elevated by the rising of the horn in contact with the underside of the material,—the horn being acted upon by the spring $B^4$—, will vary more or less according to the thickness of the material at the point where the screw threaded wire is to be inserted into the stock, and consequently the upper end of the rod $G'$ upon which the measuring leg $G^3$ rests, by occupying different positions, will permit the roller $D^{16}$ to enter more or less the notches or spaces of the cam $D^{17}$, so that more or less of the cam grades of the said cam will act to move the lever $D^{14}$ more or less according to the thickness of the stock, and consequently according to the length to which the wire is to be fed for the fastening next to be cut off, the said lever $D^{14}$ being employed to actuate the devices for that purpose, as will be described.

The cam $B^{13}$ at its periphery has two toes $C'$, $C^2$, which in the rotation of the shaft come in succession against a projection 2 secured in an adjustable manner by a suitable set screw 200, see Fig. 3, to one end of a lever C having its fulcrum on the shaft $B^{15}$, the opposite end of the said lever having as represented two arms one of which is kept against a suitable stop $C^{17}$ by a spring 112, it acting upon a rod 113, the rod entering a hole in the end of an adjusting screw 114, provided with a check nut 115, by which to hold it in adjusted position, the upper end of the screw acting against the said spring, the upper end of the spring in turn acting upon a suitable collar on the rod, the adjustment of the stop $C^{17}$ being such as to keep the point of the projection 2 just in range with the toes C', C², but so as not to touch the periphery of the said cam.

The column A has erected upon it a stud screw H, upon which is placed a hub H', of a knee-lever H³, having at its inner end sector-teeth 20, which engage like sector-teeth upon a block 21, secured to the lower end of a rock-shaft 22, having bearings at 23, 24. This rock-shaft has clamped to it a block 25, notched at its inner end to leave two lugs which, as the rock-shaft 22 is turned by the knee-lever, may be made to act upon a toe, 26, see Fig. 20, of a stop 27, pivoted at 28, and turn the said stop about said pivot, thus putting it in position to stop the feeding operation for the wire when desired, as will be described.

The measuring rod G³ has clamped upon it a foot 40, shown as a block having a downward extension, which, when the stop 27 is in one position, is free to enter the large hole in the said stop; but when said stop is turned to one side, as described, by the knee-lever, then the said extension meets the top of the stop, and so long as the said stop remains in such position the lever D¹⁴ will not be moved to feed the wire.

The stop referred to has co-operating with it a spring-controlled locking device D⁴⁰, see Fig. 20, to hold it in either of its two positions where left by the movement of the knee-lever.

One end of the lever C has connected to it by a stud C³ the upper end of a link C⁵, which at its lower end embraces a rod 116 mounted in one end of an arm C⁸, the hub of which is split as represented in Fig. 3, which split hub is clamped by a clamping screw 117, shown by dotted lines in said figure, upon a hollow rod or shaft C⁹. This shaft C⁹, made hollow for sake of lightness, has,—see Fig. 7—, a double segment C⁹ˣ having two series of teeth 118 and 119, the teeth 119 being farthest from the center of oscillation of the said shaft. The teeth 118 engage teeth 120 of an arm 121, see Fig. 6, while the teeth 119 engage teeth 122 of an arm 123, see Fig. 5, said arms carrying the wire cutters 127 and 128.

The head of the machine has a bearing stud 124, see Fig. 1, the front end of which is threaded as shown in Fig. 1ᶜ, in order that it may be screwed into the threaded hub 125 of the cutter arm 121, the said hub, projecting from the rear side of the said arm and entering a hole 126 in the cutter arm 123, so that the said arm 123 turns on the said hub. The cutter arm 121 has a cutter 127, while the arm 123 has a cutter 128, each being adjustably held in suitable grooves at the lower ends of the arms by suitable clamping screws 129. The arm 121 has a hole 130, shown by dotted lines Figs. 4 and 6, and the arm 123 has a like hole 131 in which is placed a suitable spiral spring 132 which is acted upon by a screw 133 screwed into the arm 121, rotation of the screw increasing or decreasing the effective strength of the spring, the spring normally acting to separate the arms.

From the foregoing it will be understood that whenever in the rotation of the cam B¹³ the toes C', C², strike the projection 2, the lever C will be moved to move the link C⁵ in the direction of the arrow next to it, and cause a partial oscillation of the shaft C⁹ and the segment C⁹ˣ in a direction to cause the approach of the arms and make the cutters enter and sever the wire, this being done however only after the end of the wire has been screwed into the stock.

It will be noticed that the teeth 120 and 122 are at different distances from the centers of vibration of the arms 121 and 123, and to insure equal movements of the cutters so that each will cut uniformly from the outside to the center of the wire, I have placed the teeth 119 farthest from the center of oscillation of the shaft C⁹.

The head of the machine has suitable bearings D⁷ and D⁸, for the hollow spindle A¹⁰, through a central passage of which is led the screw threaded wire to be inserted in the stock, said wire being taken from a spool $a^{10}$, see Fig. 15, mounted upon a stud $a^{21}$ to be described, the said stud passing through a forked or bifurcated portion $a^8$ of the spindle between which parts the spool is mounted so that the axis of the spool is substantially in the line of the center of rotation of the shaft. A suitable brake $a^{17}$ is employed to prevent any excess of rotation of the spool by or due to momentum when reeling the wire off the spool.

The upper end of the spindle above its bifurcated part $a^8$ is extended through the bearing D⁷ and has fast upon it a pulley A⁹ which is driven by a suitable belt extended over idle pulleys A⁸ and thence down and over a pulley A⁵ loose on a power shaft A³ provided with a suitable belt pulley A⁴ driven by a belt from any suitable counter-shaft, the said pulleys in practice having each at their contiguous sides, one a conical projection, and the other a conical cavity, to thus constitute friction clutch pulleys, the loose pulley A⁵ being pushed in driving contact with the face of the pulley A⁴ so as to cause it to be rotated therewith whenever the operator puts his foot on the lever A⁷ and elevates the wedge A⁶ so that its beveled end acts against the beveled end of a block A⁶⁰ surrounding the shaft A³ between the said rod A⁶ and the hub of the loose pulley.

The bearing D⁸ has at its opposite sides guides D⁹ over which is fitted a yoke D¹⁰, the lower end of which has a hole through which is extended the spindle A¹⁰, the edges of the opening of the yoke about the spindle being preferably provided with small steel washers, see Fig. 15, to constitute tracks, against which may run suitable anti-friction rolls or balls, one series of which is mounted in a friction box E and the other in a cap plate c', one of the said series of rolls being marked $c^2$. The cap plate $c'$ is threaded and is screwed upon the upper threaded end of the outer or feeding sleeve F shown separately in Fig. $3^b$. This outer sleeve is slotted at its lower end at one or more places, as at $b$, into which slots extend the upper ends of the wire feeding grippers $b'$ to be described, the said slots being intersected by pins $b^2$, upon which as herein shown are mounted anti-friction rollers $b^3$ which act upon and serve as closing devices or surfaces for the said grippers, but if desired the rolls may be omitted. This outer sleeve at a point above the rolls referred to is cut through at two or more places leaving openings $b^4$, the sleeve being herein represented as having three such openings, see Figs. $3^b$, $3^c$, and 17, each opening receiving a friction device which in this present instance of this invention consists of a block $b^5$ and a piece of leather or other suitable material $b^6$ at the inner side of the block, see Fig. $19^a$ the said leather acting against the outside of the spindle $A^{10}$. Each block $b^5$ has at its outer side a series of projecting teeth $b^7$ which are engaged by the teeth of a regulating ring $b^8$ surrounding the sleeve F, as best represented in Fig. 15, and provided at its interior with a screw-thread the said regulating ring tapering internally so that by screwing the same down or up, the friction of the inner sides of the friction blocks upon the spindle may be increased or decreased, the ring in practice being preferably sufficiently thin to enable it to yield somewhat to compensate for wear on the leather of the several friction blocks, and to insure uniformity of friction.

The spindle $A^{10}$ immediately below its lower bearing $D^8$ is fluted longitudinally as best shown in Fig. 16, and the inner side of the outer or feeding sleeve F is correspondingly fluted to be engaged thereby, so that as the spindle rotates it will rotate the said sleeve and yet permit the sleeve to be reciprocated vertically upon the spindle by or through the lever $D^{14}$ provided with rack teeth 5 which engage suitable rack teeth upon the rear side of the yoke $D^{10}$, see Fig. 1. Between the sleeve F and the spindle is a sleeve-like gripper-carrier $d$, shown separately in Fig. $3^a$, it having holes at $d'$ corresponding in number, and substantially opposite the holes $b^4$ in the sleeve F. The friction blocks resting in the holes $b^4$ of the sleeve F and also extending through the holes $d'$ in the gripper carrier, and toothed as stated, are slightly tapered from bottom to top, being thicker at top. The inner ends of the friction blocks in length are substantially of the length of the holes $d'$ in the gripper carrying sleeve, whereas the holes $b^4$ in the sleeve F are slightly longer than the said blocks so that there is a small amount of lost motion for a purpose to be described.

The sleeve-like gripper carrier $d$, at its lower end has suitable studs $d^2$ upon which are mounted to turn, the wire feeding grippers $b'$ before referred to, shown as levers, there being one or more such grippers, preferably three, as represented in Fig. 19, the inner edges of the grippers near their lower ends being serrated and being extended through slots $d^3$ see Fig. 15 made in the spindle extension $d^4$ screwed into, as herein represented, the lower end of the main spindle $A^{10}$, see Fig. 15. The lower ends of the gripper levers remain constantly in the slots in the spindle extension, and the upper ends of the grippers, as represented, are of cam shape or beveled or inclined so as to be acted upon by the gripper closing surfaces of suitable form, carried by the feeding sleeve, F. When the feeding sleeve starts to descend, it will be remembered that the friction devices extend through the gripper carrier and engage frictionally the spindle, and that the gripper carrier does not commence its descent with the feeding sleeve, and as a result thereof, the feeding sleeve acts first upon the gripper levers causing them to bite the wire firmly between their ends, and thereafter, during the further descent of the feeding sleeve, the latter bears continually upon the grippers, constantly holding their lower or wire gripping ends firmly against the wire, feeding the same out from the spindle and into the material or stock, the sleeve keeping up its contact with the grippers, and never relaxing, but on the contrary, increasing their hold according to the resistance to be overcome by the wire in entering the leather, until the wire is fully inserted therein. During the descent of the sleeve, after the grippers engage the wire, the gripper carrier is forced down longitudinally over the spindle by or through pressure of the sleeve on the grippers, and the friction blocks $b^5$ slide on the spindle $A^{10}$. The wire having been screwed into the stock for a length suitable for a fastening at that point, the cutters are operated to sever the wire close to the stock, or to the underside of the presser-foot $f$ resting thereon, and thereafter, the yoke $D^{10}$ is elevated by or through the spring 108 acting on one arm of the lever $D^{14}$. When the yoke starts to rise, the sleeve F rises with it, but the gripper carrier, owing to the friction devices or clamping blocks carried by it and in engagement with the spindle, does not rise with the sleeve at first, and consequently the lower end of the sleeve retires from the grippers, permitting them to release the wire, and, owing to the rapid rotation of the spindle, the grippers, due to centrifugal action, are taken from engagement with the threads of the wire, and thereafter, during the continued rise of the yoke and the sleeve F, the gripper carrying sleeve is lifted by or through the action of the lower ends of the slots $b^4$ of the said sleeve against the friction blocks, the latter at such time sliding upwardly upon the spindle, the extent to which the gripper carrier is lifted depending upon the thickness of the stock, as stated.

The rapidly rotating spindle has a worm $d^5$, the teeth of which engage worm gears $d^6$, $d^7$, having teeth of suitable pitch to operate properly with the pitch of the threads of the wire being used. The worm gear $d^6$ is fast on an auxiliary shaft $d^{7\times}$ having at its rear end, see Fig. 1, a toothed gear $d^8$ which engages a toothed pinion $d^9$ represented in Fig. 3 adjustably fixed to one side of the cam hub $B^{13}$ fast on the shaft $B^{14}$. The worm gear $d^7$ is fast on the front end of the shaft $B^{14}$ carrying the cams referred to for actuating the different parts of the machine.

By the employment of the auxiliary shaft $d^{7\times}$ I am enabled not only to equalize the strain upon the spindle by supporting it at each side its center of rotation, but I am also enabled to more accurately and powerfully drive the shaft $B^{14}$. The inner side of the cam $D^{17}$ has a groove $D^{17\times}$, see Fig. 23, into which enters a roller or other stud $e$, represented by dotted lines in Fig. 3 at the upper end of a lever $e'$ pivoted at $e^2$ upon a suitable stud in the frame-work, the lower end of the said lever being grooved or slotted as at $e^3$ to receive a swivel block $e^4$ mounted upon a pin $e^5$ made adjustable in a slot at the upper end of a lever $e^6$ pivoted at $e^7$, see Figs. 1 and 3, and having at its lower end a segmental rack 30 which engages the teeth $m^9$ of a long hub having an attached pawl-carrier $m^{19}$ provided with a pawl $m^{20}$ which engages teeth $m^{30}$ of a ratchet fast upon a shaft $m^3$ having its outer end beveled and provided with teeth to engage bevel teeth at the underside of a wheel $m'$, see Fig. 12, which is adapted to be rotated about a suitable stud 44, the wheel being kept on the stud by a suitable screw 45 and a washer 46. The shaft $m^3$ is extended through a sleeve $m^4$ firmly clamped in place in the frame-work. The shaft $m^3$ is surrounded between the box $m^4$ and the ratchet 130 with a raw-hide or other washer 161, and at its rear end within the sleeve 162 I have placed a washer 163 made adjustable by means of a screw 164, the rotation of the said screw enabling any wear upon the said washers to be compensated for, to thus always prevent any backward rotation of the shaft $m^3$ when the pawl carrier is reversed or going through its inoperative stroke. These washers also prevent any overrunning of motion. The box 162 is acted upon by a spring 165, in turn made adjustable as to its effective strength by a suitable screw 166.

The employment of the washer 163 made adjustable by the screw 164 as to its position in the box 162, precludes the contact of the end of the box with the pawl carrier during its movement, so that the pawl carrier has an absolutely free movement.

The box $m^4$, see Fig. 12, is herein represented as provided at its upper side with rack teeth which are engaged by pinion-like teeth cut on a bolt 170, mounted in a part of the head and having, as shown, a crank handle 171. By turning this shaft the box $m^4$ referred to may be adjusted longitudinally toward and from the position occupied by the lower end or nose of the spindle according to the distance it is desired to insert the fastenings from the edge of the sole, and during this operation, the feeding wheel or device $m'$ will be moved with the box. The periphery of the wheel $m'$ is toothed to engage the edge of the sole or leather upon the horn and feed the same the proper distance between one and the next fastening, the adjustment of the stud $e^5$ on the lever $e^6$ and in the slot $e^3$ of the lever $e'$ providing for variations in the length of feed of the stock. In the patent referred to, no provision was made for varying the length of feed of the stock.

The head of the machine has suitable serrations $g$, see Fig. 1, which are engaged and embraced by serrations of a jaw $g'$ at the inner end of the presser-foot $f$, a clamping screw $g^2$ causing the end of the foot to be clamped firmly upon the head, the grooves preventing any possibility of the foot being turned out of proper horizontal position, and affording means for adjusting the foot vertically. The front end of the foot may if desired have a slot as at $g^3$ through which may extend the pointed lower end or nose $g^4$ of the slotted spindle extension.

In the machine herein described the cams upon the cam shaft each have a double throw, so that they operate twice, during each rotation of the said shaft, the devices to be actuated by them, as for instance the wire feeding mechanism, the wire cutting mechanism, and the shoe feeding mechanism, whereas in former machines except the patent referred to, it has been customary to have the said cams actuate the said devices but once during the rotation of the cam shaft.

In the patent referred to wherein the wire carrying spool has as its fulcrum a bolt held in place by a nut, the operator frequently neglects putting the nut upon the bolt and setting it up correctly, and if this is overlooked, the bolt flies out during the rapid rotation of the spindle. To obviate this trouble I have devised a peculiar pin $a^{21}$ the point end of which is heavier than the head end, or in other words, the said pin is bored out or chambered at its head end, see Fig. 14, and such a pin, in view of its point being heavier and because of the rapid rotation of the spindle, will always remain in place to properly support the spool. The point end of this pin is tapered so that it may be quickly and easily inserted to confine the spool in place, which is not the case with a bolt of uniform diameter and having a threaded end. The stud $D^{15}$ on which turns the lever $D^{14}$ instrumental in feeding the wire, is also of peculiar construction, as shown in Fig. 13. This stud is bored and threaded centrally from one end, as represented in said figure, to receive a pointed screw $t^8$, and the stud is slotted longitudinally at two or more places so that the said screw may act as an expanding device when screwed into the stud and expanding the same within the bearing in the head $A^\times$.

The serrations at the lower ends of the wire feeding grippers which directly engage the wire, are and preferably will be cut or formed thereon at an inclination different from that of the pitch of the thread of the wire directly in contact with the gripper, such manner of teeth affording a better hold of the gripper on the wire and the screwing of the wire into the leather.

Each cutter carrier 121, 123, as herein shown, is provided with a guard as 160, the same being attached to the carrier in suitable manner, herein represented by a screw 161. These guards cross or overlap one another, both when the carriers are closed and when they are open, and thus prevent the possibility of chips getting between the teeth of the segment and the rack teeth of the carriers.

The spindle $A^{10}$ just below the spool has a brake shown as a wheel or roll $n$, mounted on a stud $n'$ in a plate $n^2$, through slots in which are extended clamping screws $n^3$, the said plate being made adjustable longitudinally by an adjusting screw $n^4$ toward and from the guide $n^5$ forked or bifurcated to embrace and keep the wire in the groove of the brake, the bottom of said groove being notched or threaded to engage the wire. The brake roll is provided with ratchet teeth at one or both sides of its groove to be engaged by one or two detents $n^6$, $n^7$, one being preferably a little longer than the other, as by two detents more accurate measurements or motions may be controlled as will be understood by mechanics. A suitable spring $n^8$ serves to keep the acting ends of the detents in engagement with the ratchet teeth of the brake.

From the foregoing description, it will be understood that the cutting mechanism cuts the wire at a point just below the end of the spindle and just below where the wire feeding grippers grasp the wire to feed it, and that the brake which prevents the retrograde motion of the wire when not grasped by the wire feeding grippers, is located quite near the reel of wire. This feature of applying the brake for the wire at a distance from the cutter,—the brake holding the wire while the cutter is acting and while the wire feeding grippers have retired from the wire,—is a matter of very considerable importance, for the reason that the wire being acted upon by the cutters, although being rotated at a very high speed, has an opportunity to twist a little during the cutting operation between the point where the cutters engage the wire and the brake, and as a result thereof, the cutters are enabled to effect a chisel pointed cut, leaving a chisel point on the extremity of the wire, which greatly assists its entrance into the stock.

In the machine described in United States Patent No. 403,835 the feed rolls grip the wire close to the cutters and retain their grip upon the wire at all times, and in practice it was found that the thread of the wire so held rigidly close to the cutting point, was marred, dulled, bruised or blunted, so that it failed at times to enter the stock in the best manner.

The ring $b^8$ surrounding the feeding sleeve loosely is free to move outside the said sleeve and without contact therewith. This sleeve also wholly supports the friction devices or blocks, and is in turn supported by the teeth on the outer sides of the said friction devices or blocks engaging the threads at the inner side of the ring. The tapering inner side of the ring $b^8$ co-operating with the reversely tapering blocks enables the ring to support the blocks from falling.

Referring to Fig. 3, it will be seen that the gear $d^9$ is attached to the cam $B^{13}$ by a series of set screws $d^{30}$ extended through slots in the gear $d^9$, such slots providing for adjustment of the gear with relation to the toes of the cam $B^{13}$, as is necessary to compensate for wear and to insure correct timing of the action of the cutters with relation to the wire feeding mechanism.

I claim—

1. In a machine for inserting screw threaded wire, a continuously rotating wire carrying spindle slotted longitudinally for the reception of gripper levers; and a gripper carrier provided with gripper levers; combined with devices to vibrate said gripper levers and to move them longitudinally with relation to the length of the said spindle, whereby said gripper levers are first closed positively upon the wire and then made to feed the latter longitudinally through the spindle without the descent of the spindle, substantially as described.

2. A machine for inserting threaded wire into soles of boots and shoes for the formation of fastenings, it containing the following instrumentalities, viz:—a continuously rotating wire carrying spindle slotted longitudinally for the reception of a gripper; a gripper carrier,; a gripper made as a lever and pivoted thereon, and a gripper closing device, and devices to reciprocate the gripper carrier vertically and slide the gripper longitudinally with relation to the spindle and in the slot therein—whereby the gripper is made to act against the wire and feed the same, the contact of the gripper with the wire being increased or diminished in accordance with the resistance offered by the material to the passage of the wire through it, substantially as described.

3. A machine for inserting threaded wire, it containing the following instrumentalities, viz:—a rotating wire carrying spindle provided with slots near its lower end, a gripper carrying sleeve surrounding said spindle and adapted to rotate with and to be slid vertically thereon; a series of wire feeding grippers made as levers; a feeding sleeve; a lever D; a cam to move it; connections between said lever and said feeding sleeve to move the same vertically during the rotation of the said spindle, the said feeding sleeve being shaped at its lower end to, in its descent, first act upon the grippers and cause them to firmly grasp the wire preparatory to moving the said gripper levers longitudinally with relation to the spindle to feed the wire out from the spindle into the stock, substantially as described.

4. In a machine for inserting threaded wire, the following instrumentalities, viz:—a wire carrying spindle; a connected gripper carrier; a series of wire feeding grippers carried thereby; a feeding sleeve, surrounding the spindle loosely and having gripper closing surfaces; and a series of friction blocks extended through openings in the said feeding sleeve and gripper carrier and bearing against the said spindle frictionally, the said blocks bearing frictionally against the spindle while the latter is moved vertically, substantially as described.

5. In a machine for inserting threaded wire, the following instrumentalities, viz:—rotating wire carrying spindle; a connected gripper carrier; a series of wire feeding grippers carried thereby; a surrounding feeding sleeve having gripper closing surfaces; a series of friction blocks extended through openings in the said sleeve and gripper carrier and bearing against the said spindle frictionally; and means to rotate the said spindle and gripper carrier in unison the openings in the feeding sleeve for the reception of the friction blocks being longer than the said blocks to afford lost motion, whereby the grippers during the descent of the sleeve may be made to grasp the wire, the said sleeve as it is elevated retiring from the grippers, leaving the latter free to open and retire from engagement with the wire, substantially as described.

6. In a machine for inserting threaded wire, the following instrumentalities, viz:—a wire carrying spindle; a surrounding gripper carrier provided with grippers to engage the wire; a feeding sleeve provided with surfaces to actuate the grippers and cause them to clamp the wire preparatory to feeding the same; a series of friction blocks; and an adjusting device to cause the said friction blocks to engage the spindle with more or less force, substantially as described.

7. In a machine for inserting threaded wire, the following instrumentalities, viz:—a rotating wire carrying spindle fluted externally; a feeding sleeve fluted internally to be engaged thereby and provided with openings, and having gripper closing surfaces; friction blocks working in said openings means to automatically reciprocate the said feeding sleeve on the said spindle for a greater or less distance according to the thickness of the stock; and a gripper carrying sleeve provided with a series of grippers to engage the wire, and having openings for the passage through it of the said friction blocks, substantially as described.

8. In a machine for inserting threaded wire, the following instrumentalities, viz:—a rotating wire carrying spindle provided with a worm; a cam shaft having at one end a worm gear in engagement with the said worm, and provided at its other end with a toothed gear and having a series of cams; combined with an auxiliary shaft parallel to the cam shaft and provided at one end with a worm gear and at its other end with a pinion, the latter worm gear being also driven by the worm on the spindle, the pinion on the auxiliary shaft engaging the toothed gear on the cam shaft, to operate, substantially as described.

9. In a machine for inserting threaded wire, the following instrumentalities, viz:—a rotating wire carrying spindle provided with a worm; a cam shaft having at one end a worm gear in engagement with the said worm, and provided at its other end with a toothed gear and having a series of cams; combined with an auxiliary shaft parallel to the cam shaft and provided with at one end with a worm gear and at its other end with a pinion, the latter worm gear being also driven by the worm on the spindle, the pinion on the auxiliary shaft engaging the toothed gear on the cam shaft, a gripper carrying sleeve; a series of wire feeding grippers made as levers; a feeding sleeve to act on and cause the said grippers to firmly grip the wire preparatory to feeding the same; and connections between the said carrier and sleeve, to operate, substantially as described.

10. In a machine for inserting metallic fastenings, the following instrumentalities, viz:—a wire carrying spindle; a gripper carrying sleeve; wire grippers made as levers having beveled or inclined arms; and friction devices; combined with a feeding sleeve which in its descent first acts on and closes the grippers upon the wire whatever may be its diameter, and thereafter by continued pushing on the grippers causes the gripper carrying sleeve to move downwardly on the spindle overcoming the friction between the friction devices and the spindle, substantially as described.

11. A wire carrying spindle; a surrounding gripper carrier; its attached wire feeding grippers having serrated or toothed ends to engage the wire, the inclination of the said teeth being at an angle or different from that of the threads of the wire at the point where the grippers engage the same, substantially as described.

12. A wire carrying spindle; a surrounding gripper carrier having attached wire feeding grippers; and a feeding sleeve having gripper closing surfaces; combined with friction blocks extended through the said sleeve and gripper carrier and engaging the said spindle; and a tapering ring to act upon the outer sides of the said friction blocks to govern the extent of friction between the blocks and the spindle, substantially as described.

13. A wire carrying spindle; a surrounding gripper carrier having attached wire feeding grippers; and a feeding sleeve having gripper closing devices; combined with friction blocks extended through the said sleeve and gripper carrier and engaging the said spindle; and a tapered yielding ring to act upon the outer sides of the said friction blocks to govern the extent of friction between the blocks and the spindle, substantially as described.

14. The rotating wire carrying spindle, its slotted detachable extension, and attached nose, combined with wire feeding gripper-levers made to extend through slots in the said spindle extension, and means to actuate the said gripper levers to feed the wire through the said spindle, substantially as described.

15. The wire carrying spindle having a yoke-like portion between its ends, and the wire carrying spool placed therein; combined with a pin having its point-end the heavier, to operate, substantially as described.

16. The combination with the head, of the lever $D^{14}$, and its fulcrum pin, bored, threaded, and split, as described, and provided with an expanding device, to operate, substantially as set forth.

17. The rotating wire carrying spindle, the wire carrying spool mounted thereon and moved thereby; and intermittingly actuating wire feeding devices located near the lower ends of the spindle; combined with a rotating brake and co-operating guides located between the spool carrying the wire and the said wire feeding devices to prevent the wire from sliding backwardly within the said spindle, substantially as described.

18. The combination with the rotating wire carrying spindle forked at its upper end to receive and carry the coil of wire; of a rotating brake located between the spool carrying the wire and the feeding devices for the wire; and a pawl to prevent retrograde motion of the said brake, substantially as described.

19. A rotating wire carrying spindle, combined with a brake, having an annular groove a detent to prevent retrograde motion of the brake, and a guide constructed substantially as described to receive the wire coming from the spool carried by the spindle and direct it into the annular groove of the brake, to operate, substantially as described.

20. A rotating wire carrying spindle; its spool to carry the wire, combined with a rotating brake, and with a guide, as $n^5$, and with means to adjust one with relation to the other to compensate for wear of the parts and wire of different diameters, substantially as described.

21. In a machine for inserting screw threaded wire, the following instrumentalities, viz:— a continuously rotating wire carrying spindle slotted longitudinally for the reception of gripper levers; a gripper carrier; wire gripping levers mounted thereon; a feeding sleeve; a lever as $D^{14}$, a cam to actuate said lever, the latter sliding the said sleeve vertically with relation to the said spindle, yet allowing it to rotate freely therewith; a measuring leg jointed to the said lever; a horn to support the material; connections intermediate the said horn and measuring leg and made adjustable with relation to the said measuring leg by or through variations in the thickness of the stock, the said feeding sleeve in its longitudinal descent upon the rotating spindle, acting first upon the gripper levers to cause them to be closed upon the wire, and thereafter in the continued descent of the sleeve continuing to hold the said gripper levers in contact with the wire and move them longitudinally in the slots of the spindle and with them the wire, to feed the latter into the material resting upon the horn, substantially as described.

22. The combination with the head of a nailing machine provided with one or more vertical serrations as $g$, of a longitudinally adjustable foot having one or more serrations to engage the said serrations $g$, and with a screw to retain said foot in adjusted position upon the said head, substantially as described.

23. The cutter carriers having teeth, combined with the oscillating rack to engage the said teeth and open and close the carriers, and with a guard to prevent chips of wire from getting into the space between the said teeth and thus prevent the proper action of the carriers, substantially as described.

24. The ratcheted pawl-carrier forming part of the shoe feeding mechanism; and the actuating cam $B^{13}$; combined with the lever $e$, the lever $e^6$ having a rack, and an adjustable connection between said levers whereby the throw of the said pawl-carrier may be varied as desired, substantially as described.

25. The feed wheel, the shaft having teeth to engage and rotate it, the sleeve in which the said shaft rotates, a ratchet attached to said shaft, a pawl-carrier mounted loosely on the said shaft, a guide to receive one end of said shaft, an adjusting screw, and a washer interposed between the end of the said shaft and the said adjusting screw, substantially as described.

26. In a machine for inserting screw threaded wire, the following instrumentalities, viz:— a rotating spindle having a hollow passage for the wire, a brake or device located at a considerable distance from the lower end of the spindle and adapted to prevent retrograde motion of the wire; intermittingly acting wire feeding levers to act upon the wire near the lower end of the spindle to feed the same; and cutting mechanism to sever the wire at the end of the spindle while the feeding levers break their contact with the wire and leave the latter free to fall behind the speed of the spindle during the cutting operation, substantially as described.

27. In a machine for inserting screw threaded wire, the following instrumentalities, viz:— a support for the stock; a rotating wire carrying spindle; intermittingly acting wire feeding grippers adapted to grasp and feed the wire and then release the same and retire therefrom; actuating devices for said grippers to move them for a greater or less distance according to the thickness of the material; cutting mechanism located below the said spindle and the said intermittingly acting wire feeding devices; and a brake for the wire located on and carried by the spindle at a point above the wire feeding grippers, the said brake preventing retrograde motion of the wire in the direction opposite its feeding movement, to operate, substantially as described.

28. In a machine for inserting threaded wire the following instrumentalities, viz:—a rotating wire carrying spindle provided with a worm; a cam shaft having at one end a worm gear to engage the worm of the spindle and having at or near its other end a cam $B^{13}$ provided with toes, and also a pinion; wire cutting mechanism; a shaft parallel to the cam shaft, and provided at one end with a worm gear and at its other end with a pinion, and means to adjust that one of said pinions carried by the cam shaft with relation to the toes on the cam $B^{13}$, to operate, substantially as described.

In testimony whereof I have signed my name to this specification in the presence of two subscribing witnesses.

LOUIS GODDU.

Witnesses:
GEO. W. GREGORY,
EDWARD F. ALLEN.